United States Patent [19]

Chung et al.

[11] Patent Number: 5,558,936
[45] Date of Patent: Sep. 24, 1996

[54] HIGH SELECTIVITY HOLLOW FIBERS

[75] Inventors: Tai-Shung Chung, Randolph; Edward R. Kafchinski, Winfield, both of N.J.

[73] Assignee: Hoechst Celanese Corp, Somerville, N.J.

[21] Appl. No.: 739,063

[22] Filed: Aug. 1, 1991

[51] Int. Cl.$^6$ .............. D02G 3/02; B01D 39/00; B01D 63/02
[52] U.S. Cl. .............. 428/378; 428/395; 428/398; 210/500.23; 210/500.39; 210/506; 96/14
[58] Field of Search .................. 428/378, 395, 428/398; 210/500.23, 500.39, 506; 96/14

[56] References Cited

U.S. PATENT DOCUMENTS

| | | | |
|---|---|---|---|
| 3,925,211 | 12/1975 | Schumann et al. | 210/500.28 |
| 4,125,452 | 11/1978 | Latty | 210/500.23 |
| 4,486,376 | 12/1984 | Makino et al. | 210/500.39 |
| 4,818,452 | 4/1989 | Kneifel et al. | 264/41 |
| 4,900,626 | 2/1990 | Fabre | 428/398 |
| 4,929,405 | 5/1990 | Hohn | 264/41 |
| 4,952,220 | 8/1990 | Langsam et al. | 55/158 |
| 5,074,891 | 12/1991 | Kohn et al. | 55/16 |

*Primary Examiner*—Kathleen L. Choi
*Attorney, Agent, or Firm*—Michael W. Ferrell

[57] ABSTRACT

PVP-coated asymmetric hollow fibers made from SIXEF™-Durene, a polyimide made from 2,2-bis[3,4-dicarboxyphenyl] hexafluoropropane dianhydride and 2,3,5,6-tetramethylphenylene diamine monomers, and a process for making such fibers. These coated fibers have a separation factor that exceeds 6 for oxygen and nitrogen and a permeance of at least about 10 ppm cc(STP)/(sec cm$^2$ cm-Hg). A polymer dope comprising SIXEF™-Durene in a solvent system containing N-methyl-2-pyrrolidone ("NMP") and an organic acid such as propionic acid ("PA") is prepared by polymerizing the polyimide monomers in NMP to form a polyamic acid polymer and imidizing this polymer using the acid anhydride. Water released from the polymer in the imidization reaction converts the anhydride to acid. The dope is wet-spun into hollow fibers; the fibers are coagulated in water. The fibers are then evenly coated with PVP, preferably by dipping the fibers in a dilute PVP solution.

3 Claims, No Drawings

HIGH SELECTIVITY HOLLOW FIBERS

BACKGROUND OF THE INVENTION

This invention relates to the field of hollow fibers, especially to asymmetric hollow fibers comprising SIXEF™-Durene polyimide coated with PVP.

In creating a gas or liquid separation membrane, it is desirable to have both a high rate of permeation or throughput and a high separation factor. This combination of characteristics permits the effective separation of a relatively large volume of fluid per unit time. Large rates of permeation also allow the membrane to be operated at lower pressures, which improves cost-effectiveness and reduces wear and tear.

Highly porous membranes tend to be very permeable, but do a poor job of separating fluids into their components. Less porous, dense membranes can be more selective, but at the cost of reduced throughput. Asymmetric membranes represent a compromise between the two in that they generally have a thin, dense separation layer and a less dense, more permeable layer.

Asymmetric membranes are often chosen for separation applications because they may provide a good combination of permeation and separation. Hollow fibers having a dense skin and a porous body can be used to make such membranes. Such fibers generally are coated with a highly permeable substance to smooth surface imperfections and achieve acceptable selectivities.

U.S. Pat. No. 4,705,540 issued to Hayes describes polyimide gas separation membranes made by casting a polyimide solution on a plate. The polyimides described by Hayes include aromatic fluoropolymers.

U.S. Pat. No. 4,871,494 issued to Kesting, et al. describes a process for forming asymmetric gas separation membranes having graded density skins. This process comprises dissolving a hydrophobic polymer in a Lewis acid:base solvent system wherein the Hildebrand parameters of the solvent species and the polymer are within less than 1.5, creating a dope from this solution, forming the dope into an appropriate shape, coagulating the dope, desolvating, washing and drying. According to the patent, the resultant membrane has increased free volume as evidenced by a glass transition temperature greater than the bulk glass transition temperature of the polymer.

U.S. Pat. No. 4,881,954 issued to Bikson, et al. describes permeable membranes for enhanced gas separation in which an asymmetric porous support is coated with a separation layer. The support is made asymmetric prior to coating to provide mechanical stability and a uniform support surface.

U.S. patent application Ser. No. 686,739 filed on Apr. 7, 1991 by Chung, et al. describes a method for making asymmetric hollow fibers from fluoropolymers. The outer layer of these fibers is coated with a highly permeable substance to achieve high selectivities.

SUMMARY OF THE INVENTION

The present invention comprises asymmetric hollow fibers made from SIXEF™-Durene, a polyimide made from 2,2-bis[3,4-dicarboxyphenyl]hexafluoropropane dianhydride and 2,3,5,6-tetramethylphenylene diamine monomers and having the formula

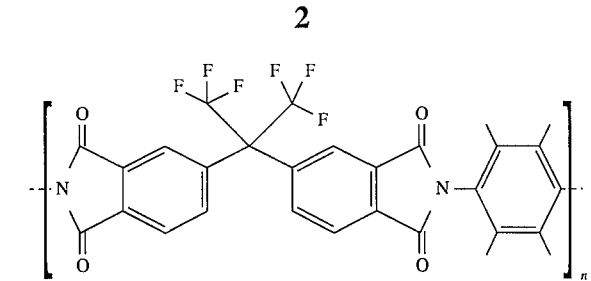

herein the fibers are coated with poly-4-vinylpyridine ("PVP"), and a process for making such fibers. These coated fibers have a separation factor that exceeds 6, and is preferably about 7, for oxygen and nitrogen and an oxygen permeance of at least about 10 ppm cc(STP)/(sec cm$^2$ cm-Hg), preferably at least about 14 ppm cc(STP)/(sec cm$^2$ cm-Hg).

In the process of this invention, a polymer dope comprising SIXEF™-Durene in a solvent system containing N-methyl-2-pyrrolidone ("NMP") and an organic acid such as propionic acid ("PA") is prepared by polymerizing the polyimide monomers in NMP to form a polyamic acid polymer and imidizing this polymer using the acid anhydride, e.g. propionic anhydride. Water released from the polymer in the imidization reaction converts the anhydride to acid. The dope is wet-spun into hollow fibers; the fibers are coagulated in water. The fibers are then coated with PVP by dip coating or another suitable means to achieve the desired product.

An object of the present invention is to provide a hollow fiber suitable for use in gas separation membranes.

Another object of the present invention is to provide a novel asymmetric hollow fiber comprising PVP-coated SIXEF™-Durene.

A further object of the present invention is to provide a hollow fiber that has both a high separation factor for O$_2$/N$_2$ and a good permeance, and a process for making same.

Yet another object is to provide a relatively simple and inexpensive method for making a permeable, highly selective hollow fiber.

Other objects of the present invention will be apparent to those skilled in the art from the following description and claims.

DETAILED DESCRIPTION OF THE PREFERRED EMBODIMENTS

In a preferred embodiment of the present invention, a polymer dope is made by polymerizing 2,2-bis[3,4-dicarboxyphenyl]hexafluoropropane dianhydride and 2,3,5,6-tetramethylphenylene diamine monomers in NMP to form a polyamic acid

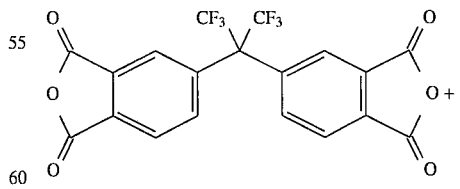

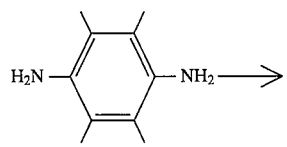

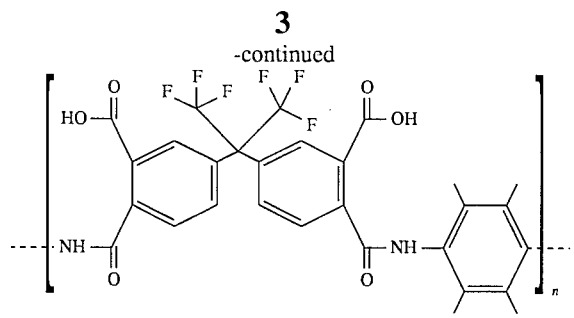

which is then imidized using propionic anhydride and a base catalyst, such as β-picolin or an acid catalyst, to form

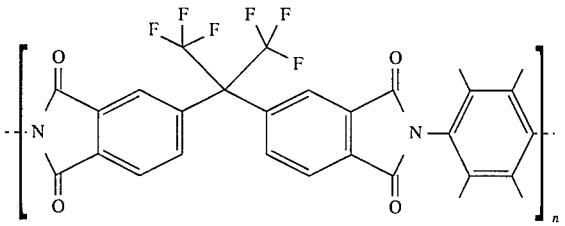

SIXEF™-Durene (a polymer made by the Hoechst Celanese Corporation). Acetic anhydride or butyric anhydride may be substituted for propionic anhydride in this process.

The monomers are reacted in approximately equimolar amounts at room temperature, i.e. about 20°–30° C., for about 15–25 hours, preferably about 20 hours; the reaction is carried out in NMP, with an approximate weight ratio of NMP to solids of between about 75:25 and 88:12, preferably about 80:20; a greater or lesser amount of solvent may be used, provided the monomers are concentrated enough to polymerize effectively but not so concentrated that a fluid dope cannot form. The imidization reaction is also carried out at room temperature, for about 15–22 hours, preferably about 16–19 hours. The exact time and temperature of the reactions may be varied provided that the same product results; reactions run at higher temperatures generally require less time to go to completion.

Water released during the imidization reaction converts the anhydride to PA; therefore, the resulting dope is a solution of the polyimide in NMP/PA.

The polymer dope is then wet-spun using a conventional die for forming hollow fibers, with glycerine or PA used as the hollow fiber core solvent and water as the fiber coagulant. The dope goes directly from the die into a water bath to quickly freeze the fiber structure and form a dense outer layer of polyimide. The die temperature and the bath temperature are typically about room temperature, preferably between about 20° C. and about 60° C. for the die and between about 20° C. and about 50° C. for the bath, although other temperatures may be used; those skilled in the art will be able to determine the useful temperature ranges for a given system. Conventional means then may be used to collect the hollow fiber.

One goal of the process of the present invention is to provide a thin, dense outer layer on the fiber. This layer is essential to provide an asymmetric fiber that is useful in fluid separations. If this layer is too thick the fiber will not have sufficient permeability. The dense outer layer is formed when the water bath coagulates the fiber; the exposed outer surface of the fiber forms a denser structure than the inner fiber where coagulation proceeds more slowly. The thickness of the dense outer layer should be less than about 3 microns, preferably between about 0.10 and 2.2 microns. The permeance of the uncoated fibers generally will be about 50–350 ppm cc(STP)/(sec cm² cm-Hg).

Preferably, no air gap should exist between the die and the water bath, because such a gap will cause poorer selectivity, i.e., the fiber will have a lower separation factor for $O_2/N_2$.

The core solvent is preferably glycerine or PA, or another liquid that will not promote coagulation in the center of the fiber. Examples of other suitable core solvents include acetic acid, butyric acid, propionic anhydride, acetic anhydride or butyric anhydride. Mixtures of the acids and anhydrides may also be used.

The fiber may be spun in any suitable hollow fiber die apparatus. Those skilled in the art will be able to determine which apparatus are suitable.

The fibers are then coated with PVP to increase their selectivity; a reduction in permeance accompanies the increase in selectivity. One preferred coating method is dip coating the fiber at room temperature by passing it into and out of a solution of PVP in methanol, or another suitable solvent (one that sufficiently dissolves PVP and will readily evaporate after coating the fiber). The solution contains about 0.06–0.25% PVP by weight and preferably contains about 0.06–0.15% PVP by weight, more preferably about 0.09–0.15% and most preferably about 0.12–15%. If the PVP concentration is too low, the maximum increase in selectivity will not be achieved, although a higher permeance will be possible. If excess PVP is coated on the fiber, the permeance will be reduced further without a significant additional gain in selectivity.

The hollow fibers of the present invention preferably will have a separation factor of at least 6.0, more preferably at least about 6.5, and most preferably about 6.9 or higher, for oxygen and nitrogen; this separation factor is defined as the ratio of the permeance of oxygen to the permeance of nitrogen.

In coating the fiber with PVP, the key is to achieve an even coating of the proper thickness so that the desired selectivity and permeance may be achieved. A thin or uneven coating will not yield the full benefits of the present invention, whereas an excessively thick coating will have unnecessarily low permeance. Although the exact thickness of the optimum coating has not been determined, those skilled in the art will be able to achieve the full benefits of the invention by following the preferred method described above for coating the fiber, or by substituting another coating method, without undue experimentation.

The following Example illustrates the present invention. However, the invention should not be construed as limited to the embodiments illustrated.

EXAMPLE I

About 0.2 mole of each monomer, 2,2-bis[3,4-dicarboxyphenyl]hexafluoropropane dianhydride and 2,3,5,6-tetramethylphenylene diamine, were placed in a reaction vessel with 487 grams of NMP. The monomers reacted for about 20 hours at room temperature to form a polyamic acid in NMP (20% solids content by weight).

A 300-gram quantity of this polyamic acid/NMP was combined with 73.4 grams of β-picolin (an initiator) and 28.2 grams of propionic anhydride and reacted for about 17 hours at room temperature to form a 401.6-gram polymer dope of 14.1% SIXEFT™-Durene polyimide in NMP/PA. This dope was then wet-spun into hollow fibers using a glycerine core solvent; each fiber was quenched in a room temperature water bath after spinning. Most fibers were then passed through a solution of PVP/methanol of the concentration specified in the following table, with the following results:

| Coating solution | P/L for $O_2$ | α |
| --- | --- | --- |
| No coating | 126 | 4.37 |
| 0.0375% PVP | 66.5 | 5.42 |
| 0.150% PVP | 14.5 | 6.9 |
| 0.187% PVP | 13.4 | 6.9 |

α = $O_2/N_2$ separation factor
P/L for $O_2$ = permeance of oxygen in ppm cc (STP)/(sec $cm^2$ cm-Hg)

The tabulated data shows that a selectivity as high as 6.9 may be achieved if a coating solution of at least 0.15% PVP is used, but that if the PVP concentration exceeds this value permeance is lost without a further gain in selectivity. Ideally, therefore, the PVP concentration should not exceed about 0.15%. If much lower concentrations are used, a lesser selectivity gain is achieved, with less permeance loss.

Extrapolating from these data, the following conclusions can be drawn: To achieve a selectivity of about 6.0 or higher by this method, a coating solution of at least about 0.06% PVP is probably needed, while a solution of about 0.09% PVP or higher may be used to achieve a selectivity of about 6.5 or higher. The ideal PVP concentration to achieve an α of about 6.9 without unduly reducing P/L is believed to be in the approximate range of 0.12–0.15%. These numbers may vary depending on how long the fiber is in contact with the solution, the characteristics of the fiber being coated, and other factors.

Many variations of the present invention not illustrated herein will occur to those skilled in the art. The present invention is not limited to the embodiments illustrated and described herein, but encompasses all the subject matter within the scope of the appended claims.

We claim:

1. A coated asymmetric hollow fiber for use in separation membranes consisting essentially of a polyimide of the formula

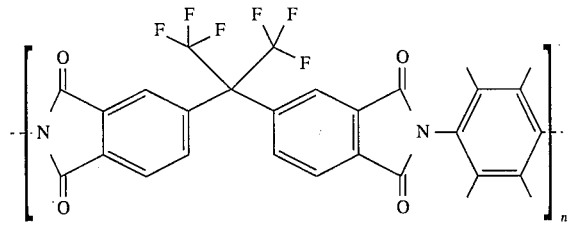

and a poly-4-vinylpyridine coating, which coated fiber has a separation factor of at least about 6.0 for oxygen and nitrogen and an oxygen permeance of at least about 10 ppm cc(STP)/(sec $cm^2$ cm-Hg).

2. A hollow fiber according to claim 1 wherein said separation factor is at least about 6.5 and an oxygen permeance of at least about 14 ppm cc(STP)/(sec $cm^2$ cm-Hg).

3. A hollow fiber according to claim 2 wherein said separation factor is about 6.9.

* * * * *